(12) United States Patent
Amidei et al.

(10) Patent No.: US 9,332,290 B2
(45) Date of Patent: May 3, 2016

(54) METHODS, SYSTEMS, AND MEDIA FOR CERTIFYING A PLAYBACK DEVICE

(71) Applicant: Sonic IP, Inc., San Diego, CA (US)

(72) Inventors: William David Amidei, San Diego, CA (US); Eric William Grab, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 45 days.

(21) Appl. No.: 14/145,457

(22) Filed: Dec. 31, 2013

(65) Prior Publication Data

US 2015/0189344 A1 Jul. 2, 2015

(51) Int. Cl.
H04N 7/173 (2011.01)
H04N 21/258 (2011.01)
H04N 21/234 (2011.01)
H04N 21/24 (2011.01)
H04N 21/2662 (2011.01)

(52) U.S. Cl.
CPC ... *H04N 21/25825* (2013.01); *H04N 21/23406* (2013.01); *H04N 21/2407* (2013.01); *H04N 21/2662* (2013.01)

(58) Field of Classification Search
CPC .......................... H04N 21/235; H04N 21/435
USPC ................. 725/27, 34, 116, 118, 148
See application file for complete search history.

(56) References Cited

U.S. PATENT DOCUMENTS

| 7,043,460 | B2 | 5/2006 | Deboer et al. | |
| 7,180,477 | B2 | 2/2007 | Howell | |
| 8,239,904 | B2 | 8/2012 | Leventu et al. | |
| 8,782,727 | B1* | 7/2014 | Nagarajan et al. | 725/118 |
| 2009/0031035 | A1* | 1/2009 | Dharmaraju et al. | 709/230 |
| 2010/0053337 | A1 | 3/2010 | Kirk et al. | |
| 2011/0138439 | A1* | 6/2011 | Toba | 725/148 |
| 2014/0082655 | A1* | 3/2014 | Moon et al. | 725/27 |
| 2015/0002679 | A1 | 1/2015 | Amidei et al. | |
| 2015/0002680 | A1 | 1/2015 | Amidei et al. | |
| 2015/0006724 | A1 | 1/2015 | Amidei et al. | |

* cited by examiner

*Primary Examiner* — Jivka Rabovianski
(74) *Attorney, Agent, or Firm* — KPPB LLP

(57) ABSTRACT

Methods, systems, and media for certifying a playback device are provided. In some embodiments, methods for certifying a playback device are provided, the methods comprising: identifying a plurality of playback capabilities associated with the playback device; identifying at least one certification test based on the plurality of playback capabilities; receiving a plurality of media streams corresponding to the certification test from a server; causing a first media stream to be presented by the playback device; changing a streaming condition experienced by the playback device; causing a second media stream to be presented by the playback device based on the streaming condition; capturing, using a camera, a video signal representing video content presented by the playback device; and determining, using a hardware processor, whether the playback device has passed the certification test based at least in part on the video signal.

33 Claims, 4 Drawing Sheets

METHODS, SYSTEMS, AND MEDIA FOR CERTIFYING A PLAYBACK DEVICE

TECHNICAL FIELDS

Methods, systems, and media for certifying a playback device are provided. More particularly, the disclosed subject matter relates to certifying playback capabilities (e.g., adaptive streaming capabilities) of a playback device using a device including a camera and/or a microphone.

BACKGROUND OF THE INVENTION

There are many conventional approaches to certifying a playback device that can decode and present audio content and/or video content. For example, a playback device can receive a video stream from a server and present the video stream on a display device. While the video stream is displayed on the display device, a user can determine whether the video stream is displayed with a desired video quality. However, manual certification is time consuming and inaccurate. The result of the certification heavily relies on the user's skills, lighting, and other factors which can be unpredictable.

Accordingly, new mechanisms for certifying playback devices are desirable.

SUMMARY OF THE INVENTION

In view of the foregoing, systems, methods, and media for certifying a playback device are provided. In some embodiments, methods for certifying a playback device are provided, the methods comprising: identifying a plurality of playback capabilities associated with the playback device; identifying at least one certification test based on the plurality of playback capabilities; receiving a plurality of media streams corresponding to the certification test from a server; causing a first media stream to be presented by the playback device; changing a streaming condition experienced by the playback device; causing a second media stream to be presented by the playback device based on the streaming condition; capturing, using a camera, a video signal representing video content presented by the playback device; and determining, using a hardware processor, whether the playback device has passed the certification test based at least in part on the video signal.

In some embodiments, systems for certifying a playback device are provided, the systems comprising: at least one hardware processor that is configured to: identify a plurality of playback capabilities associated with the playback device; identify at least one certification test based on the plurality of playback capabilities; receive a plurality of media streams corresponding to the certification test from a server; cause a first media stream to be presented by the playback device; change a streaming condition experienced by the playback device; cause a second media stream to be presented by the playback device based on the streaming condition; receive a video signal representing video content presented by the playback device; and determine whether the playback device has passed the certification test based at least in part on the video signal; and a camera that is configured to capture the video signal.

In some embodiments, non-transitory computer-readable media containing computer-executable instructions that, when executed by a processing circuitry, cause the processing circuitry to perform a method for certifying a playback device are provided, the method comprising: identifying a plurality of playback capabilities associated with the playback device; identifying at least one certification test based on the plurality of playback capabilities; receiving a plurality of media streams corresponding to the certification test from a server; causing a first media stream to be presented by the playback device; changing a streaming condition experienced by the playback device; causing a second media stream to be presented by the playback device based on the streaming condition; capturing a video signal representing video content presented by the playback device; and determining whether the playback device has passed the certification test based at least in part on the video signal.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Mechanisms (which can be systems, methods, media, etc.) for certifying a playback device are provided.

In some embodiments, the mechanisms can certify various playback capabilities (e.g., adaptive streaming capabilities) of a playback device using a device including a camera and/or a microphone, such as a mobile phone, a tablet computer, a wearable computer, a gaming device, and/or any other suitable mobile device.

In some embodiments, the mechanisms can discover a playback device and identify one or more playback capabilities associated with the playback device which are to be certified. In some embodiments, the playback capabilities can include presenting video content and/or audio content with desired quality. In some embodiments, the playback capabilities can include one or more streaming functions that can be performed by the playback device (e.g., adaptive streaming functions).

In some embodiments, the mechanisms can identify one or more certification tests that can be used to certify the identified playback capabilities. The mechanisms can then receive test data from a server and perform the certification tests on the playback device using the test data.

In some embodiments, the mechanisms can transmit a test media stream including suitable video content and/or audio content to the playback device and cause the video content and/or the audio content to be presented by the playback device. In some embodiments, the mechanisms can capture a video signal representing the video content presented by the playback device using a suitable camera. Additionally or alternatively, the mechanisms can capture an audio signal representing the audio content presented by the playback device using a suitable microphone.

In some embodiments, the mechanisms can analyze the video signal and/or the audio signal and determine whether the playback device has passed the certification test based on the analysis. For example, the mechanisms can determine whether the video content and the audio content are presented in a synchronized manner based on the video signal and the audio signal. In some embodiments, the mechanisms can determine that the playback device has failed the certification test in response to determining that the video content and the audio content are not presented in a synchronized manner.

In some embodiments, the mechanisms can change a streaming condition that is experienced by the playback device (e.g., by performing bandwidth throttling). The mechanisms can then determine whether a re-buffering event has occurred when the playback device switches to a video stream encoded at a lower resolution. In some embodiments, the mechanisms can determine that the playback device has failed the certification test in response to detecting a re-buffering event.

Figure 1:
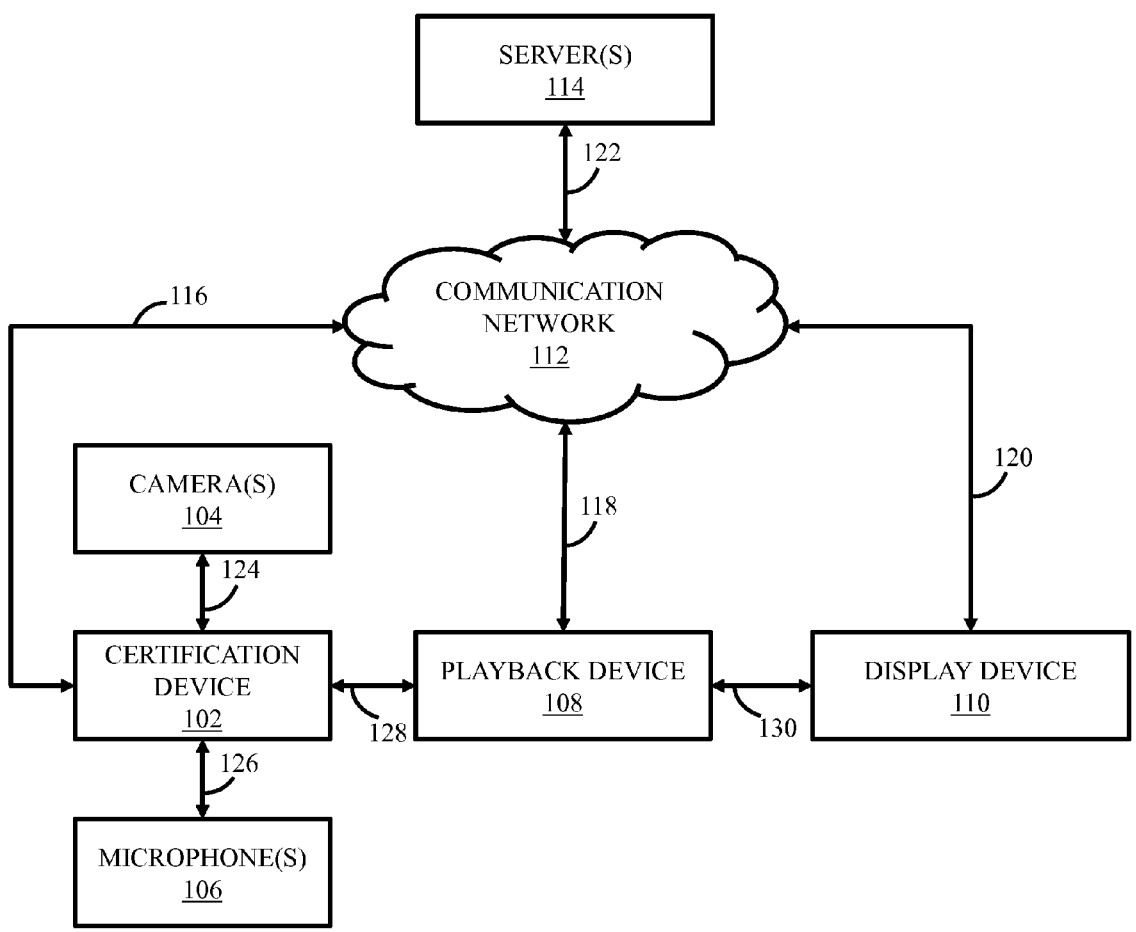
FIG. 1 shows a generalized block diagram of an example of an architecture of hardware that can be used to certify a playback device in accordance with some embodiments of the disclosed subject matter.

Turning to FIG. 1, a generalized block diagram of an example 100 of an architecture of hardware that can be used to certify a playback device in accordance with some embodiments is shown. As illustrated, architecture 100 can include a certification device 102, one or more cameras 104, one or more microphones 106, a playback device 108, a display device 110, a communication network 112, one or more servers 114, and communication paths 116, 118, 120, 122, 124, 126, 128, and 130.

Certification device 102 can include any suitable circuitry that is capable of capturing, processing, and/or analyzing video content and audio content presented by a playback device, performing network manipulation tasks (e.g., bandwidth throttling, service redirection, and/or any other suitable network manipulation task), streaming media streams to a playback device at variable bits, communicating with a playback device and a server, and/or performing any other suitable functions. Examples of certification device 102 can include a mobile phone, a tablet computer, a laptop computer, and/or any other suitable device.

In some embodiments, certification device 102 can communicate with playback device 108 through one or more communication channels (e.g., a WIFI connection, a BLUE-TOOTH connection, an Ethernet connection, and/or any other suitable communication channel). In some embodiments, certification device 102 can select a communication channel using a lowest-common denominator communication method and perform one or more certification tests on playback device 108 using the selected communication channel.

In some embodiments, certification device 102 can be coupled to one or more cameras 104 via a communication path 124. Camera(s) 104 can include any suitable circuitry that is capable of capturing still images and/or moving images, such as a charge-coupled device (CCD) sensor, a complementary metal-oxide-semiconductor (CMOS) sensor, and/or any other suitable circuitry. Examples of camera(s) 104 can include a digital camera, a camcorder, a video camera, a video recorder, a webcam, a PC camera, and/or any other suitable camera.

In some embodiments, certification device 102 can be coupled to one or more microphones 106 via a communication path 126. Microphone(s) 106 can include any suitable circuitry that is capable of receiving acoustic input from a user, capturing audio data from its surroundings, generating audio signals, processing audio signals, and/or performing other suitable functions.

In some embodiments, each of camera(s) 104 and microphone(s) 106 can be implemented as one or more stand-alone devices or integrated with certification device 102.

Playback device 108 can include any suitable circuitry that is capable of receiving, converting, processing, presenting, and/or transmitting media content, causing media content to be presented on display device 110, and/or performing any other suitable functions. For example, playback device 108 can include a set-top box, a digital media receiver, a DVD player, a BLU-RAY player, a game console, a desktop computer, a laptop computer, a tablet computer, a mobile phone, a television device, and/or any other suitable device, and/or any suitable combination of the same.

Display device 110 can include any suitable circuitry that is capable of decoding, encoding, and/or presenting media content, such as video content, audio content, and/or any other suitable content. For example, display device 110 can include a media center computer, a CRT display, an LCD, an LED display, a plasma display, a touch-screen display, a simulated touch screen, a television device, a tablet computer, a mobile phone, and/or any other suitable device. In some embodiments, display device 104 can present a user with three-dimensional content.

In some embodiments, communication network 112 may be any one or more networks including the Internet, a mobile phone network, a mobile voice network, a mobile data network (e.g., a 3G, 4G, or LTE network), a cable television network, a satellite network, a public switched telephone network, a local area network, a wide area network, a fiber-optic network, any other suitable type of communications network, and/or any suitable combination of these communications networks.

Server(s) 114 can include any suitable circuitry that is capable of transmitting test data to certification device 102, receiving test results from certification device 102, and/or performing any other suitable functions.

In some embodiments, server(s) 114 can include one or more types of content distribution equipment for distributing any suitable media content, including television distribution facility equipment, cable system head-end equipment, satellite distribution facility equipment, programming source equipment (e.g., equipment of television broadcasters, such as NBC, ABC, HBO, etc.), intermediate distribution facility equipment, Internet provider equipment, on-demand media server equipment, and/or any other suitable media content provider equipment. NBC is a trademark owned by the National Broadcasting Company, Inc., ABC is a trademark owned by the ABC, INC., and HBO is a trademark owned by the Home Box Office, Inc.

Server(s) 114 may be operated by the originator of content (e.g., a television broadcaster, a Webcast provider, etc.) or may be operated by a party other than the originator of content (e.g., an on-demand content provider, an Internet provider of content of broadcast programs for downloading, etc.).

Server(s) 114 may be operated by cable providers, satellite providers, on-demand providers, Internet providers, providers of over-the-top content, and/or any other suitable provider(s) of content.

Server(s) 114 may include a remote media server used to store different types of content (including video content selected by a user) in a location remote from any of the user equipment devices. For example, media Server(s) 114 can include one or more content delivery networks (CDN).

As referred to herein, the term "media content" or "content" should be understood to mean one or more electronically consumable media assets, such as television programs, pay-per-view programs, on-demand programs (e.g., as provided in video-on-demand (VOD) systems), Internet content (e.g., streaming content, downloadable content, Webcasts, etc.), movies, films, video clips, audio, audio books, and/or any other media or multimedia and/or combination of the same. As referred to herein, the term "multimedia" should be understood to mean media content that utilizes at least two different content forms described above, for example, text, audio, images, video, or interactivity content forms. Media content may be recorded, played, displayed or accessed by user equipment devices, but can also be part of a live performance. In some embodiments, media content can include over-the-top (OTT) content. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC.

Media content can be provided from any suitable source in some embodiments. In some embodiments, media content can be electronically delivered to a user's location from a remote location. For example, media content, such as a Video-On-Demand movie, can be delivered to a user's home from a cable system server. As another example, media content, such as a television program, can be delivered to a user's home from a streaming media provider over the Internet.

In some embodiments, each of certification device 102, camera(s) 104, microphone(s) 106, playback device 108, display device 110, and server(s) 114 can be implemented in any suitable hardware. For example, each of certification device 102, camera(s) 104, microphone(s) 106, playback device 108, display device 110, and server(s) 114 can be implemented in any of a general purpose device such as a computer or a special purpose device such as a client, a server, a mobile terminal (e.g., a mobile phone), and/or any other suitable device. Any of these general or special purpose devices can include any suitable components such as a hardware processor (which can be a microprocessor, digital signal processor, a controller, and/or any other suitable hardware processor). In some embodiments, each of certification device 102, camera(s) 104, microphone(s) 106, playback device 108, display device 110, and server(s) 114 can include a suitable storage device, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same.

In some embodiments, each of certification device 102, camera(s) 104, microphone(s) 106, playback device 108, display device 110, and server(s) 114 can be implemented as a stand-alone device or integrated with other components of architecture 100. For example, in some embodiments, one or both of camera(s) 104 and microphone(s) 106 can be integrated with certification device 102. As another example, playback device 108 can be integrated with display device 110 in some embodiments.

In some embodiments, playback device 108 can be connected to certification device 102 and display device 110 through communications paths 128 and 130, respectively. In some embodiments, certification device 102, playback device 108, display device 110, and server(s) 114 can be connected to communication network 112 through communications paths 116, 118, 120, and 122, respectively.

Communications paths 116, 118, 120, 122, 124, 126, 128, and 130 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths, in some embodiments.

Figure 2:
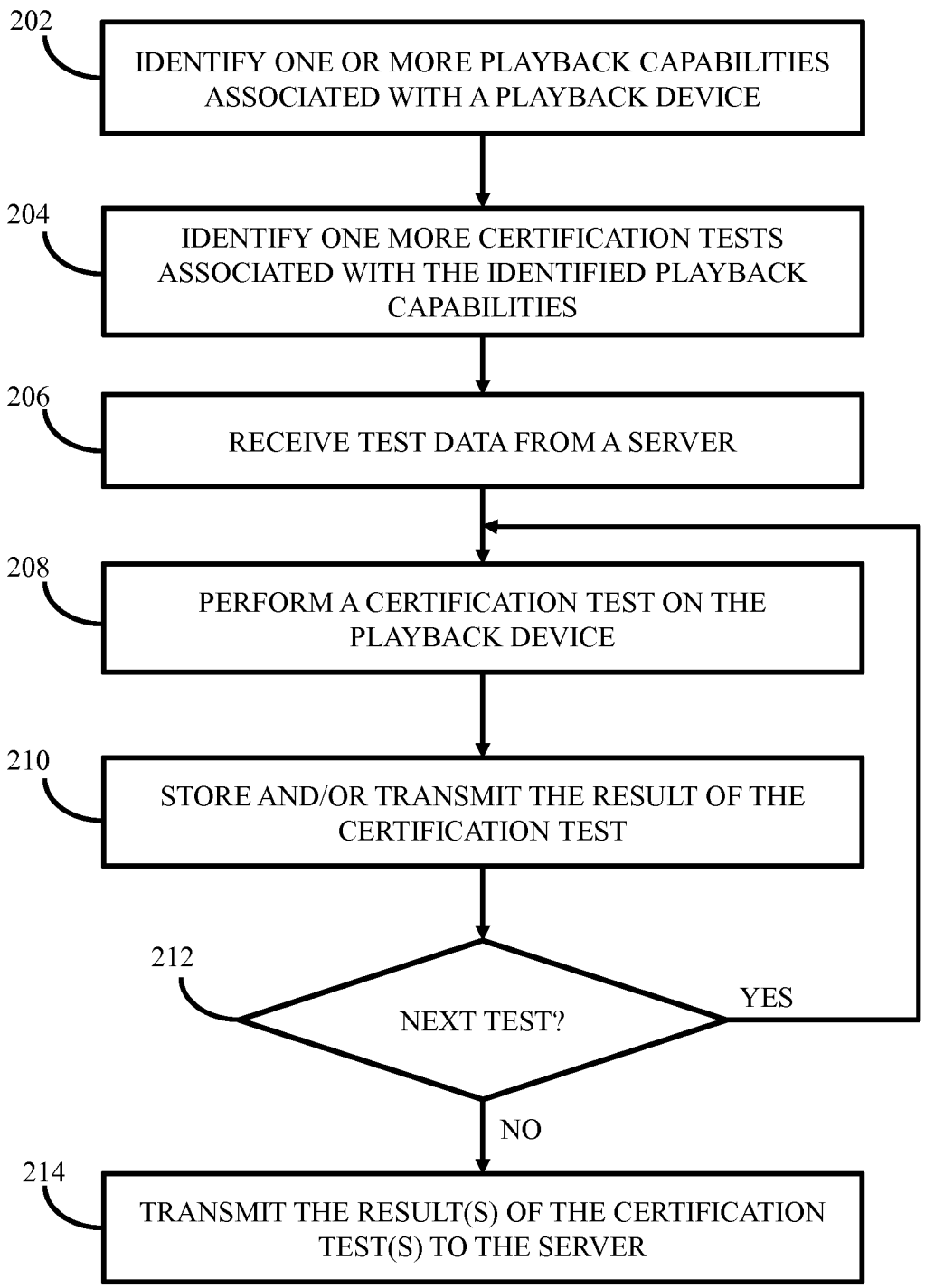
FIG. 2 shows a flow chart of an example of a process for certifying a playback device in accordance with some embodiments of the disclosed subject matter.

Turning to FIG. 2, an example 200 of a process for certifying a playback device in accordance with some embodiments of the disclosed subject matter is shown. In some embodiments, process 200 can be implemented by a hardware processor of one or more components of architecture 100 of FIG. 1, such as a certification device 102.

As illustrated, process 200 can begin by identifying one or more playback capabilities associated with a playback device that are to be certified at 202. Any suitable playback capabilities can be certified in some embodiments. For example, the playback capabilities can include presenting video content with desired video quality. In a more particular example, video quality can be measured by one or more characteristics of video content presented by the playback device, such as a video resolution (e.g., 480 p, 576 p, 720 p, 1080 p, 4 k, and/or any other suitable video resolution), a bit depth, a video format (e.g., MPEG-4/ASP, AVI, DIVX, H.264, MKV, the High Efficiency Video Coding (HEVC), and/or any other suitable video format), a frame rate, a peak signal-to-noise ratio, and/or any other suitable characteristic of video content.

As another example, the playback capabilities can include presenting audio content with desired audio quality. In a more particular example, audio quality can be measured by one or more characteristics of audio content presented by the playback device, such as an audio frame rate, an audio format (e.g., WAV, WMA, MKV, MP3, and/or any other suitable audio format), a bit depth, and/or any other suitable characteristic of audio content.

As yet another example, the playback capabilities can include one or more streaming functions that can be performed by the playback device, such as adaptive bitrate streaming, trick play (e.g., fast-forward, rewind, resume playback across devices, and/or any other suitable trick play function), and/or any other suitable streaming function.

In some embodiments, the playback capabilities to be certified can be identified in any suitable manner. For example, the certification device can query the playback device to obtain the playback capabilities that are to be certified. In a more particular example, the certification device can scan a barcode (e.g., a two-dimensional barcode) displayed by the playback device (on a screen of the playback device and/or a screen of a display device coupled to the playback device) and process the barcode to obtain the playback capabilities associated with the playback device.

As another example, the certification device can obtain an identifier associated with the playback device (e.g., a product identifier, an application identifier, and/or any other suitable identifier associated with the certification device) and/or any other suitable information about the playback device (e.g., by querying the playback device). The certification device can then obtain information about playback capabilities associated with the playback device based on the identifier associated with the certification device (e.g., by querying a database that stores such information).

At 204, process 200 can identify one or more certification tests to be performed on the playback device based on the identified playback capabilities. Any suitable certification test can be used to certify one or more of the identified playback capabilities. For example, a certification test can be performed to determine whether the playback device is capable of presenting video content and/or audio content with the video quality and/or the audio quality identified at 202. As another example, a certification test can be performed to determine whether the playback device is capable of performing one or more of the streaming functions identified at 202.

At 206, process 200 can receive test data from a server. The test data can include any suitable information that can be used to perform the identified certification tests on the playback device. For example, the test data can include one or more test media streams to be processed and presented by the playback device during the certification tests. In some embodiments, a test media stream can include any suitable media content that can be used to certify one or more playback capabilities, such as video content, audio content, captioning content, text, on-screen displays, and/or any other suitable content. In some embodiments, the media streams can include video content encoded at various resolutions, frame rates, bitrates, and/or any other suitable encoding parameters.

As another example, the test data can include license keys, stream configuration parameters, and/or any other suitable data that can be used to perform a certification test.

At 208, process 200 can perform a certification test on the playback device using the test data. The certification test can be performed in any suitable manner. For example, process 200 can cause one or more test media streams to be presented by the playback device and capture a video signal representing video content presented by the playback device and an audio signal representing audio content presented by the playback device. Process 200 can then analyze the captured video signal and/or the captured audio signal to determine whether the playback device possesses the identified playback capabilities. In a more particular example, a certification can be performed using process 300 of FIG. 3 and/or process 400 of FIG. 4 as described hereinbelow.

As another example, process 200 can verify whether the playback device is capable of negotiating a shared secret using a suitable key-generation protocol, such as the Diffie-Hellman (DH) protocol. In a more particular example, process 200 can determine whether the playback device is capable of generating a secure cipher key under the DH protocol. Additionally or alternatively, process 200 can determine whether the playback device is capable of encrypting and/or decrypting communications between the certification device and the playback device using the secure cipher key.

As yet another example, process 200 can verify the integrity of the playback device. In a more particular example, process 200 can receive a certification associated with the playback device (e.g., a Secure Sockets Layer (SSL) certificate) and validate the certification using a suitable authentication scheme. In another more particular example, process 200 can receive a digital signature signed by the playback device and verify the digital signature.

As still another example, process 200 can determine whether the playback device is capable of implementing a security protocol, such as the SSL, the Transport Layer Security (TLS), and/or any other suitable security protocol. In a more particular example, process 200 can transmit to the playback device an invalid certificate associated with a server and determine whether the playback is capable of detecting and rejecting the invalid certificate. In another more particular example, process 200 can transmit to the playback device a valid certificate associated with a server and determine whether the playback device is capable of validating the valid certificate in a suitable manner.

In some embodiments, process 200 can store and/or transmit the result of the certification test at 210. In some embodiments, the result of the certification test can include whether the playback device has passed the certification test and/or any other suitable information about the playback device's performance during the certification test.

At 212, process 200 can determine whether one or more certification tests are to be performed on the playback device. In some embodiments, process 200 can loop back to 208 in response to determining that one or more certification tests are to be performed on the playback device.

Alternatively, process 200 can transmit data about the results of the certification tests to the server at 214.

Figure 3:
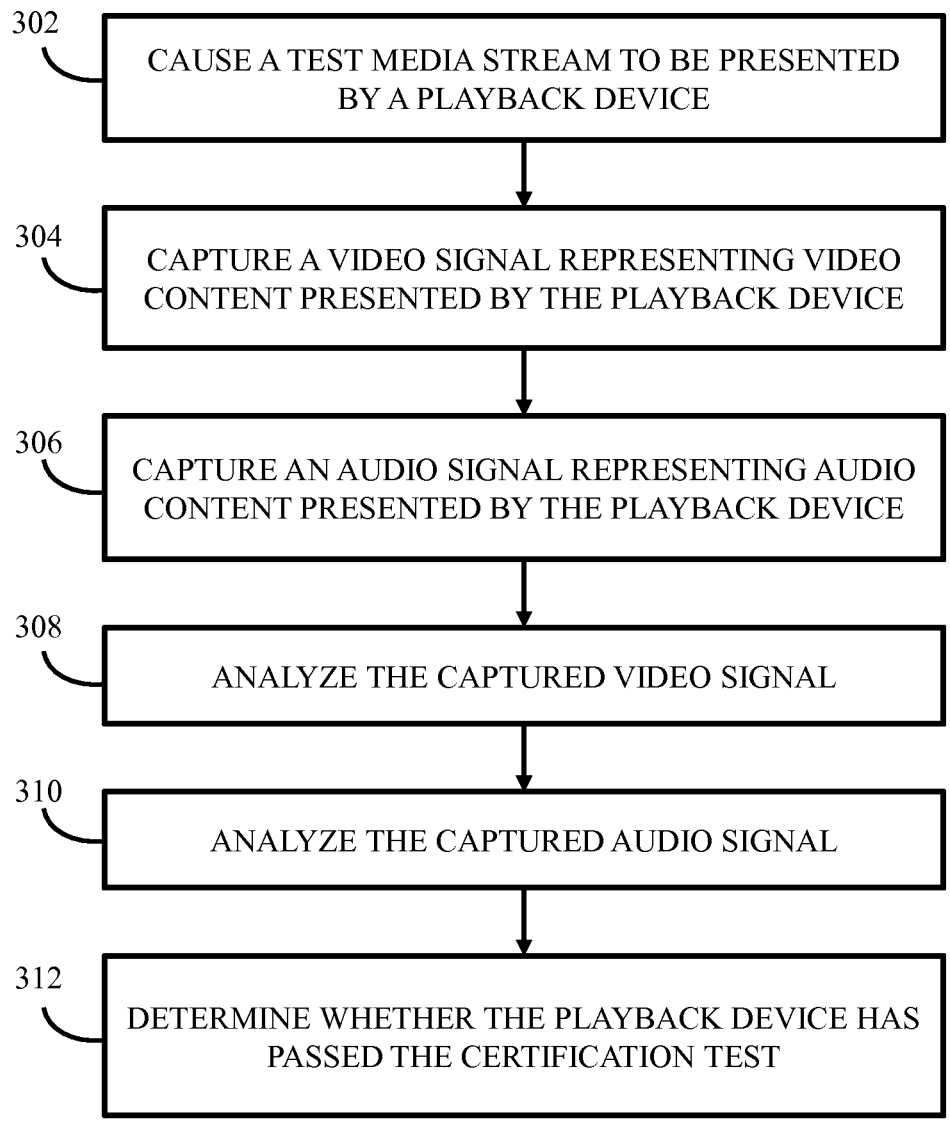
FIG. 3 shows a flow chart of an example of a process for certifying video and/or audio playback capabilities in accordance with some embodiments of the disclosed subject matter.

Turning to FIG. 3, a flowchart of an example 300 of a process for certifying video and/or audio playback capabilities in accordance with some embodiments of the disclosed subject matter is shown. In some embodiments, process 300 can be implemented by a hardware processor of one or more components of architecture 100 of FIG. 1, such as a certification device 102.

As illustrated, process 300 can begin by causing a test media stream to be presented by a playback device at 302. The test media stream can include any suitable media content that can be used to verify one or more of the video and/or audio playback capabilities of the playback device. For example, the test media stream can include video content with one or more given characteristics, such as a video resolution, a frame rate, a video format, a bit depth, a bit rate, and/or any other suitable characteristic. As another example, the test media stream can include audio content with one or more given characteristics, such as an audio frame rate, a bit depth, an audio format, and/or any other suitable characteristic.

In some embodiments, the test media stream can be presented by the playback device in any suitable manner. For example, the test media stream can be presented on a display device that is coupled to and/or integrated with the playback device.

At 304, process 300 can capture a video signal representing video content that is presented by the playback device. The video signal can be captured in any suitable manner. For example, the certification device can take one or more pictures of the test media stream being displayed on the display device. In a more particular example, the certification device can control one or multiple cameras (e.g., built-in cameras, external cameras, and/or any other suitable cameras) to take one or more pictures of the screen of the display device or a suitable portion of the screen while the test media stream is being displayed on the display device.

As another example, the certification device can capture one or more screenshots of the test media stream being presented on the display device. In a more particular example, while the test media stream is being displayed on the display device, the certification device can capture a screenshot of the screen of the display device, an active window application presented on the screen, and/or any suitable portion of the screen. In some embodiments, the certification device can retrieve an image of the video content displayed on the display device from a frame buffer in the display device. In another more particular example, the certification device can record the screen output of the display device while the test media stream is being displayed. The certification device can then generate a set of images of the displayed test media stream (e.g., a screencast).

At 306, process 300 can capture an audio signal representing audio content presented by the playback device. The audio signal can be captured in any suitable manner. For example, the certification device can activate a microphone that can capture audio data from its surroundings and record the audio data while the test media stream is presented by the playback device.

At 308, process 300 can analyze the video signal. For example, process 300 can determine a set of presentation times of a set of video frames of the captured video signal. In a more particular example, a presentation time of a video frame can be determined based on a timestamp corresponding to the start of the presentation of the video frame, a timestamp corresponding to the end of the presentation of the video frame, and/or any other suitable timestamp associated with the presentation of the video frame.

As another example, process 300 can retrieve a reference video signal representing the video content of the test media stream and identify one or more video frames of the reference video signal that match one or more video frames of the captured video signal. In a more particular example, a video frame of the reference video signal can be regarded as a match to a video frame of the captured video signal and thus a matching frame when the difference between the two video frames does not exceed a predetermined threshold.

In some embodiments, upon identifying a set of matching video frames (e.g., a set of video frames of the reference video signal that match a set of video frames of the captured video signal), process 300 can determine a set of presentation times corresponding to the set of matching video frames. In a more particular example, a presentation time of a matching video frame can be determined based on a presentation timestamp (PTS) associated with the matching video frame.

At 310, process 300 can analyze the captured audio signal. For example, the certification device can calculate the frame rate, frequency response, bit rate, and/or any other suitable characteristic of the captured audio signal.

As another example, the certification device can identify one or more audio frames of the captured audio signal that correspond to one or more video frames of the captured video frame. The certification device can then determine a set of presentation times of the identified audio frames. In some embodiments, an audio frame can be regarded as corresponding to a video frame when the audio frame and the audio frame are scheduled to be presented in a synchronized manner.

At 312, process 300 can determine whether the playback device has passed the certification test. This determination can be made by the certification device in any suitable manner. For example, the certification device can determine that the playback device has failed the certification test in some embodiments in which the playback device is incapable of presenting video content and audio content in a synchronized manner. In a more particular example, the certification device can compare a presentation time of a video frame of the captured video signal and a presentation time of an audio frame in the captured audio signal that corresponds to the video frame. The certification device can then determine that the playback device has failed the certification test in some embodiments in which the difference between the two presentation times exceeds a predetermined threshold.

As another example, the certification device can determine that the playback device has failed the certification test in response to determining that the playback device is incapable of presenting video content with desired video quality. In a more particular example, the certification device can compare one or more video frames of the captured video signal and one or more matching frames of the reference video signal. The certification device can then determine that the playback device has failed the certification in some embodiments in which the difference between the video frames of the captured video signal and the matching video frames exceeds a predetermined threshold.

Additionally or alternatively, the certification device can compare a presentation time of a video frame of the captured video signal and a presentation time of a matching video frame of the reference video signal. The certification device can then determine that the playback device has failed the certification test in some embodiments in which the difference between the two presentation times exceeds a predetermined threshold.

As yet another example, the certification device can determine that the playback device has failed the certification test when the playback device is incapable of presenting audio content with desired audio quality. In a more particular example, the certification device can compare the captured audio signal and a reference audio signal representing the audio content contained in the test media stream. The certification device can then determine that the playback device has failed the certification test in some embodiments in which the difference between the captured audio signal and the reference audio signal exceeds a predetermined threshold.

Figure 4:
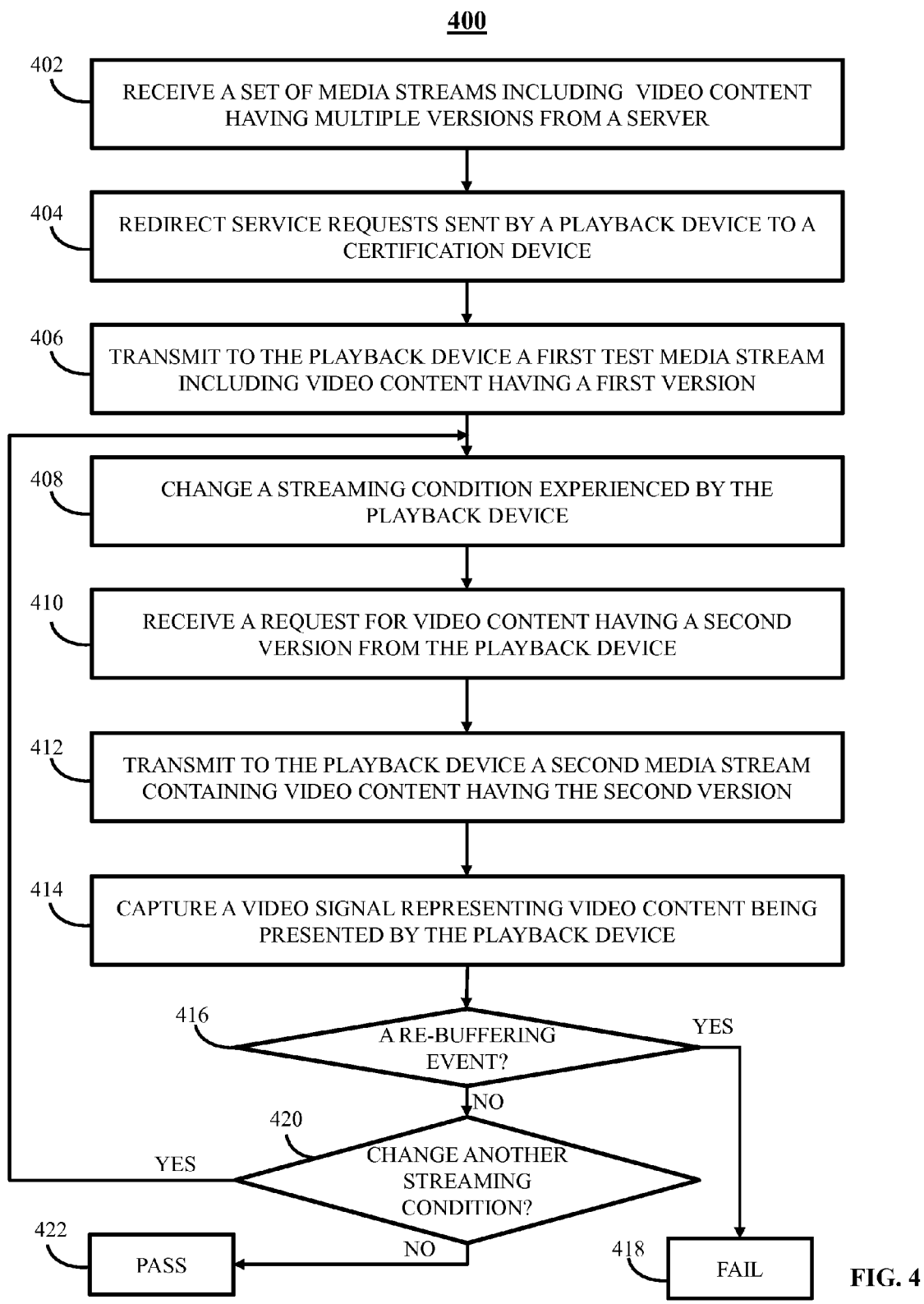
FIG. 4 shows a flowchart of an example of a process for performing a certification test to certify adaptive bitrate streaming capabilities of a playback device in accordance with some embodiments of the disclosed subject matter.

Turning to FIG. 4, a flowchart of an example 400 of a process for performing a certification test to certify adaptive bitrate streaming capabilities of a playback device is shown. In some embodiments, process 400 can be implemented by a hardware processor of one or more components of system 100 of FIG. 1, such as a certification device 102 of FIG. 1.

As illustrated, process 400 can begin by receiving a set of test media streams including video content having different versions from a server at 402. For example, the set of test media streams can include video content encoded at multiple bit rates, resolutions, frame rates, and/or any other suitable encoding parameters.

At 404, process 400 can redirect service requests sent by a playback device to a certification device. This redirection can be performed in any suitable manner. For example, one or more requests to stream media content from the server can be redirected to the certification device.

At 406, process 400 can transmit to a playback device a first test media stream including video content having a first version. The first test media stream can include any suitable data that can be used to present the video content. For example, the first test media stream can include a set of video frames encoded at a given resolution, frame rate, bit rate, bit depth, and/or any other suitable encoding parameter. As another example, the first test media stream can include parameters that can be used to decode, process, and/or present the set of video frames, audio content to be presented with the set of video frames, and/or any other suitable data.

At 408, process 400 can change a streaming condition experienced by the playback device. Any suitable streaming condition can be changed in a suitable manner to verify one or more streaming functions that can be performed by the playback device. For example, process 400 can change the network bandwidth that can be utilized to transmit media streams and/or messages between the certification device and the playback device. In a more particular example, process 400 can constrain the network bandwidth to a suitable bitrate using a suitable bandwidth throttling technique.

At 410, process 400 can receive a request for video content having a second version from the playback device. The request can be received in any suitable manner. For example, the request can be directed to the server from the playback device and can be redirected to the certification device in some embodiments.

In some embodiments, the video content having the second version can correspond to a lower quality version of the video content having the first version. For example, the video content having the second version can include a set of frames encoded at a lower resolution, a lower bit rate, and/or any other suitable coding parameter.

At 412, process 400 can transmit to the playback device a second test media stream containing video content having the second version. In some embodiments, the second test media stream can include a set of video frames encoded at a second resolution, a second frame rate, a second bit rate, a second bit depth, and/or any other suitable encoding parameter. As another example, the second test media stream can include parameters that can be used to decode, process, and/or present the set of video frames, audio content to be presented with the set of video frames, and/or any other suitable data.

At 414, process 400 can capture a video signal representing video content being presented by the playback device. In some embodiments, block 414 can be performed in substantially the same manner as block 304 of FIG. 3 as described above. For example, the video signal can be captured by a suitable camera when the first media stream and the second media stream are presented on a display (e.g., a display of the playback device or a display of a display device coupled to the playback device) via the playback device.

At 416, process 400 can determine whether a re-buffering event has occurred during the playback of the first test media stream and the second test media stream. This determination can be made in any suitable manner. For example, a re-buffering event can be regarded as having occurred when a time interval between the presentation of the last video frame of the first test media stream and the presentation of the first video frame of the second test media stream exceeds a threshold. In some embodiments, the time interval can be calculated based on a presentation time of the last video frame of the first test media stream and a presentation time of the first video frame of the second test media stream.

As another example, a re-buffering event can be regarded as having occurred when the delay in the presentation of the first video frame of the second test stream exceeds a threshold. In some embodiments, the delay in the presentation of the first video frame of the second test stream can be calculated based on the difference between a presentation time of the first frame of the second test stream and a presentation time of a matching frame of a reference video signal.

In some embodiments, process 400 can determine that the playback device has failed the certification test at 418 in response to determining that a re-buffering event occurred during the playback of the first test stream and/or the second test stream.

Alternatively, process 400 can determine whether one or more changes to streaming conditions are to be made at 420. In some embodiments, process 400 can loop back to 408 in response to determining that one or more changes to streaming conditions are to be made.

Alternatively, process 400 can determine that the playback device has passed the certification test at 422.

It should be noted that processes 200, 300, and 400 of FIGS. 2, 3, and 4 can be performed concurrently in some embodiments. It should also be noted that the above steps of the flow diagrams of FIGS. 2-4 may be executed or performed in any order or sequence not limited to the order and sequence shown and described in the figures. Furthermore, it should be noted, some of the above steps of the flow diagrams of FIGS. 2-4 may be executed or performed substantially simultaneously where appropriate or in parallel to reduce latency and processing times. And still furthermore, it should be noted, some of the above steps of the flow diagrams of FIGS. 2-4 may be omitted.

In some embodiments, any suitable computer readable media can be used for storing instructions for performing the mechanisms and/or processes described herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for certifying a playback device are provided.

The above described embodiments of the present disclosure are presented for purposes of illustration and not of limitation, and the present disclosure is limited only by the claims which follow.

What is claimed is:

1. A method for certifying capabilities of a playback device using a certification device, the method comprising:
  displaying a test image on a display coupled to a playback device;
  capturing the test image displayed on the display coupled to the playback device using a camera coupled to a certification device;
  processing the test image using the certification device to identify a plurality of capabilities associated with the playback device;
  identifying a particular set of certification tests based on the plurality of capabilities associated with the playback device using the certification device, wherein the particular set of certification tests comprises:
    an interactivity certification test,
    a shared secret certification test,
    a security protocol certification test, and
    a video and audio synchronization test;
  directing the playback device to perform a series of operations according to the interactivity certification test, the shared secret certification test, the security protocol certification test, and the video and audio synchronization test using the playback device;
  capturing information produced by the playback device according to the series of operations using the certification device; and
  determining, using a hardware processor, whether the playback device has passed the certification tests according to captured information using the certification device.

2. The method of claim 1, wherein directing the playback device to perform a series of operations according to the interactivity certification test further comprises directing the playback device to perform the following operations:

receiving a plurality of media streams corresponding to a certification test from a server;

causing a first media stream to be presented by the playback device;

changing a streaming condition experienced by the playback device;

causing a second media stream to be presented by the playback device based on the streaming condition, wherein the first media stream comprises a first plurality of video frames encoded at a first resolution and wherein the second media stream comprises a second plurality of video frames encoded at a second resolution.

3. The method of claim 2, wherein the first resolution is greater than the second resolution.

4. The method of claim 3, further comprising:

determining whether a re-buffering event has occurred based at least in part on the video signal; and determining that the playback device has failed the certification test in response to determining that a re-buffering event has occurred.

5. The method of claim 1, further comprising performing bandwidth throttling.

6. The method of claim 1, wherein directing the playback device to perform a series of operations according to the interactivity certification test further comprises directing the playback device to perform the following operations:

receiving a first test stream of interactivity content from a server on the playback device;

playing back the first test stream of interactivity content using the playback device, wherein a video component of the first test stream is displayed on the display device in an active window application;

receiving interactivity input to the first test stream of interactivity content on the playback device;

capturing a screenshot of the active window application presented on the display device using a camera coupled to the certification device; and verifying that the screenshot matches expected interactivity capabilities according to the interactivity certification test using the certification device.

7. The method of claim 1, wherein directing the playback device to perform a series of operations according to the video and audio synchronization test comprises directing the playback device to perform the following operations:

receiving a first test stream of media content corresponding to the particular certification test from a server using the playback device;

playing back the first test stream of media content using the playback device, wherein a video component of the first test stream is displayed on the display device;

capturing, using a camera coupled to the certification device, a video signal from the display of the first test stream during playback;

capturing, using a microphone coupled to the certification device, an audio signal from the first test stream during playback;

determining a presentation time of a video frame of the video signal using the certification device;

determining a presentation time of an audio frame of the audio signal using the certification device; and when the presentation time of the video frame and the presentation time of the audio frame differ beyond a predetermined threshold, determining that the playback device has failed the video and audio synchronization test using the certification device.

8. The method of claim 1 wherein the test image is a barcode identifying the playback device, the certification device is a mobile device, and the playback device is a television.

9. The method of claim 1, further comprising transmitting a result of a certification test to the server.

10. The method of claim 1, wherein directing the playback device to perform a series of operations according to the shared secret certification test further comprises directing the playback device to perform the following operations:

directing the playback device to generate a secure cipher key according to a key-generation protocol using the certification device; and verifying, using the certification device, that the playback device successfully applied the secure cipher key to a test communication between the certification device and the playback device.

11. The method of claim 1, wherein directing the playback device to perform a series of operations according to the security protocol certification test further comprises directing the playback device to perform the following operations:

transmitting an invalid certificate associated with a server to the playback device; and verifying that the playback device successfully rejects the invalid certificate using the certification device.

12. A system for certifying capabilities of a playback device, the system comprising:

a playback device;

a certification device; and at least one hardware processor that is configured to:

display a test image on a display coupled to the playback device;

capture the test image displayed on the display coupled to the playback device using a camera coupled to the certification device;

processing the test image using the certification device to identify a plurality of capabilities associated with the playback device;

identify a particular set of certification tests based on the plurality of capabilities associated with the playback device using the certification device, wherein the particular set of certification tests comprises:

an interactivity certification test, a shared secret certification test, a security protocol certification test, and a video and audio synchronization test;

direct the playback device to perform a series of operations according to the interactivity certification test, the shared secret certification test, the security protocol certification test, and the video and audio synchronization test using the playback device;

capture information produced by the playback device according to the series of operations using the certification device; and determine whether the playback device has passed the certification tests according to captured information using the certification device.

13. The system of claim 12, wherein directing the playback device to perform a series of operations according to the interactivity certification test further comprises directing the playback device to perform the following operations:

receive a plurality of media streams corresponding to a certification test from a server;

cause a first media stream to be presented by the playback device;

change a streaming condition experienced by the playback device;

causing a second media stream to be presented by the playback device based on the streaming condition, wherein the first media stream comprises a first plurality of video frames encoded at a first resolution and wherein the second media stream comprises a second plurality of video frames encoded at a second resolution.

14. The system of claim 13, wherein the first resolution is greater than the second resolution.

15. The system of claim 14, wherein the hardware processor is further configured to:
   determine whether a re-buffering event has occurred based at least in part on the video signal; and
   determine that the playback device has failed the certification test in response to determining that a re-buffering event has occurred.

16. The system of claim 12, wherein the hardware processor is further configured to perform bandwidth throttling.

17. The system of claim 12, wherein directing the playback device to perform a series of operations according to the interactivity certification test further comprises directing the playback device to perform the following operations:
   receive a first test stream of interactivity content from a server on the playback device;
   playback the first test stream of interactivity content using the playback device, wherein a video component of the first test stream is displayed on the display device in an active window application;
   receive interactivity input to the first test stream of interactivity content on the playback device;
   capture a screenshot of the active window application presented on the display device using a camera coupled to the certification device; and
   verify that the screenshot matches expected interactivity capabilities according to the interactivity certification test using the certification device.

18. The system of claim 12, wherein screenshot matches expected interactivity capabilities according to the interactivity certification test using the certification device:
   receive a first test stream of media content corresponding to the particular certification test from a server using the playback device;
   playback the first test stream of media content using the playback device, wherein a video component of the first test stream is displayed on the display device;
   capture, using a camera coupled to the certification device, a video signal from the display of the first test stream during playback;
   capture, using a microphone coupled to the certification device, an audio signal from the first test stream during playback;
   determine a presentation time of a video frame of the video signal using the certification device;
   determine a presentation time of an audio frame of the audio signal using the certification device; and
   when the presentation time of the video frame and the presentation time of the audio frame differ beyond a predetermined threshold, determine that the playback device has failed the video and audio synchronization test using the certification device.

19. The system of claim 12, wherein the test image is a barcode identifying the playback device, the certification device is a mobile device, and the playback device is a television.

20. The system of claim 12, wherein the hardware processor is further configured to transmit a result of a certification test to the server.

21. The system of claim 12, wherein directing the playback device to perform a series of operations according to the shared secret certification test further comprises directing the playback device to perform the following operations:
   direct the playback device to generate a secure cipher key according to a key-generation protocol using the certification device; and
   verify, using the certification device, that the playback device successfully applied the secure cipher key to a test communication between the certification device and the playback device.

22. The system of claim 12, wherein directing the playback device to perform a series of operations according to the interactivity certification test further comprises directing the playback device to perform the following operations:
   transmit an invalid certificate associated with a server to the playback device;
   verify that the playback device successfully rejects the invalid certificate using the certification device.

23. A non-transitory computer-readable medium containing computer-executable instructions that, when executed by a processing circuitry, cause the processing circuitry to perform a method for certifying capabilities of a playback device, the method comprising:
   displaying a test image on a display coupled to a playback device;
   capturing the test image displayed on the display coupled to the playback device using a camera coupled to a certification device;
   processing the test image using the certification device to identify a plurality of capabilities associated with the playback device;
   identifying a particular set of certification tests based on the plurality of capabilities associated with the playback device using the certification device, wherein the particular set of certification tests comprises:
      an interactivity certification test,
      a shared secret certification test,
      a security protocol certification test, and
      a video and audio synchronization test;
   directing the playback device to perform a series of operations according to the interactivity certification test, the shared secret certification test, the security protocol certification test, and the video and audio synchronization test using the playback device;
   capturing information produced by the playback device according to the series of operations using the certification device; and
   determining whether the playback device has passed the certification tests according to captured information using the certification device.

24. The non-transitory computer-readable medium of claim 23, wherein directing the playback device to perform a series of operations according to the interactivity certification test further comprises directing the playback device to perform the following operations:
   receiving a plurality of media streams corresponding to a certification test from a server;
   causing a first media stream to be presented by the playback device;
   changing a streaming condition experienced by the playback device;
   causing a second media stream to be presented by the playback device based on the streaming condition, wherein the first media stream comprises a first plurality of video frames encoded at a first resolution and wherein the second media stream comprises a second plurality of video frames encoded at a second resolution.

25. The non-transitory computer-readable medium of claim 24, wherein the first resolution is greater than the second resolution.

26. The non-transitory computer-readable medium of claim 25, wherein the method further comprises:
   determining whether a re-buffering event has occurred based at least in part on the video signal; and
   determining that the playback device has failed the certification test in response to determining that a re-buffering event has occurred.

27. The non-transitory computer-readable medium of claim 23, wherein the method further comprises performing bandwidth throttling.

28. The non-transitory computer-readable medium of claim 23, wherein directing the playback device to perform a series of operations according to the interactivity certification test further comprises directing the playback device to perform the following operations:
   receiving a first test stream of interactivity content from a server on the playback device;
   playing back the first test stream of interactivity content using the playback device, wherein a video component of the first test stream is displayed on the display device in an active window application;
   receiving interactivity input to the first test stream of interactivity content on the playback device;
   capturing a screenshot of the active window application presented on the display device using a camera coupled to the certification device; and
   verifying that the screenshot matches expected interactivity capabilities according to the interactivity certification test using the certification device.

29. The non-transitory computer-readable medium of claim 23, wherein directing the playback device to perform a series of operations according to the video and audio synchronization test comprises directing the playback device to perform the following operations:
   receiving a first test stream of media content corresponding to the particular certification test from a server using the playback device;
   playing back the first test stream of media content using the playback device, wherein a video component of the first test stream is displayed on the display device;
   capturing, using a camera coupled to the certification device, a video signal from the display of the first test stream during playback;
   capturing, using a microphone coupled to the certification device, an audio signal from the first test stream during playback;
   determining a presentation time of a video frame of the video signal using the certification device;
   determining a presentation time of an audio frame of the audio signal using the certification device; and
   when the presentation time of the video frame and the presentation time of the audio frame differ beyond a predetermined threshold, determining that the playback device has failed the video and audio synchronization test using the certification device.

30. The non-transitory computer-readable medium of claim 23, wherein the test image is a barcode identifying the playback device, the certification device is a mobile device, and the playback device is a television.

31. The non-transitory computer-readable medium of claim 23, wherein the method further comprises transmitting a result of a certification test to the server.

32. The non-transitory computer-readable medium of claim 23, wherein directing the playback device to perform a series of operations according to the shared secret certification test further comprises directing the playback device to perform the following operations:
   directing the playback device to generate a secure cipher key according to a key-generation protocol using the certification device; and
   verifying, using the certification device, that the playback device successfully applied the secure cipher key to a test communication between the certification device and the playback device.

33. The non-transitory computer-readable medium of claim 23, wherein directing the playback device to perform a series of operations according to the security protocol certification test further comprises directing the playback device to perform the following operations:
   transmitting an invalid certificate associated with a server to the playback device; and
   verifying that the playback device successfully rejects the invalid certificate.

* * * * *